No. 752,414. PATENTED FEB. 16, 1904.
R. B. PRICE.
COVERED ELASTIC CORD.
APPLICATION FILED MAR. 16, 1903.
NO MODEL.

Witnesses:
E. F. Wilson
Erwin J. Lotz

Inventor:
Raymond B. Price
By Rudolph M. Lotz
Attorney.

No. 752,414. Patented February 16, 1904.

UNITED STATES PATENT OFFICE.

RAYMOND B. PRICE, OF CHICAGO, ILLINOIS.

COVERED ELASTIC CORD.

SPECIFICATION forming part of Letters Patent No. 752,414, dated February 16, 1904.

Application filed March 16, 1903. Serial No. 148,115. (No model.)

*To all whom it may concern:*

Be it known that I, RAYMOND B. PRICE, a citizen of the United States, residing at Chicago, in the county of Cook and State of Illinois, have invented certain new and useful Improvements in Covered Elastic Cords; and I do hereby declare the following to be a full, clear, and exact description of the invention, such as will enable others skilled in the art to which it appertains to make and use the same.

This invention relates to a novel construction in a covered rubber elastic cord, the object being to provide a device of this kind in which the full resiliency of the rubber is maintained; and it consists in the novel features of construction hereinafter fully described and claimed.

Figure 1:
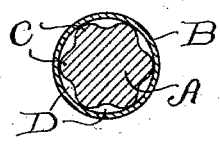
Figure 2:
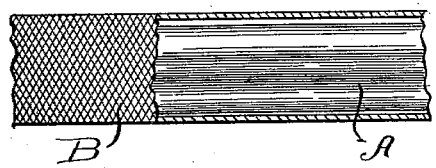
Figure 3:
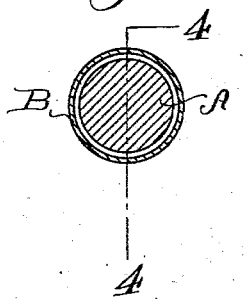
Figure 4:
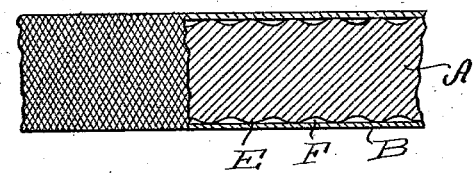

In the accompanying drawings, illustrating this invention, Figure 1 is a transverse section of a covered rubber elastic constructed in accordance with my invention. Fig. 2 is a fragmentary side elevation showing the covering partly in section. Fig. 3 is a view, partly in side elevation and partly in longitudinal section, of a slightly-modified form of construction. Fig. 4 is a transverse section on the line 4 4 of Fig. 3.

In elastic cords, particularly such as are used in athletic apparatus, the braided covering contracts when the cord is stretched to a greater extent than the lateral contraction of the rubber, and hence such covering binds on and endeavors to cut into the rubber. The pressure thus exerted unnecessarily taxes the strength of the operator and prevents the full elasticity of the cord from coming into play.

In athletic apparatus it is particularly desirable that the rubber cords should retain their full elasticity in order to equalize the strain exerted by the operator throughout the full movement of an arm or leg in exercising.

In order to prevent the covering from binding on the rubber cord, and thus reduce the normal elasticity of the entire structure, I provide room for the lateral contraction of the covering, and to this end I employ a corrugated rubber cord A, upon which the covering B is wound or braided, said covering resting upon the shoulders or ribs C and being given space for lateral contraction in the grooves D.

The rubber cord A may be either longitudinally or laterally corrugated, and such corrugations may be regular or irregular.

In Figs. 1 and 2 I have illustrated longitudinal corrugations, while in Figs. 3 and 4 I have illustrated annular corrugations E F.

I claim as my invention—

1. As a new article of manufacture, a rubber cord having a roughened surface, and a covering on said cord.

2. As a new article of manufacture, a rubber cord having depressions in its surface, and a covering on said cord, said depressions being adapted to provide room for the lateral contraction of the covering when said cord is stretched.

3. As a new article of manufacture, a corrugated rubber cord, and a covering on said cord.

In testimony whereof I affix my signature in presence of two witnesses.

RAYMOND B. PRICE.

Witnesses:
 RUDOLPH WM. LOTZ,
 ERWIN J. LOTZ.